3,412,236
OVEN CONTROL SYSTEM AND METHOD FOR
OPERATING THE SAME OR THE LIKE
Henry F. Hild and Siegfried E. Manecke, Indiana, Pa., assignors to Robertshaw Controls Company, Richmond, Va., a corporation of Delaware
Filed Mar. 7, 1966, Ser. No. 532,237
20 Claims. (Cl. 219—413)

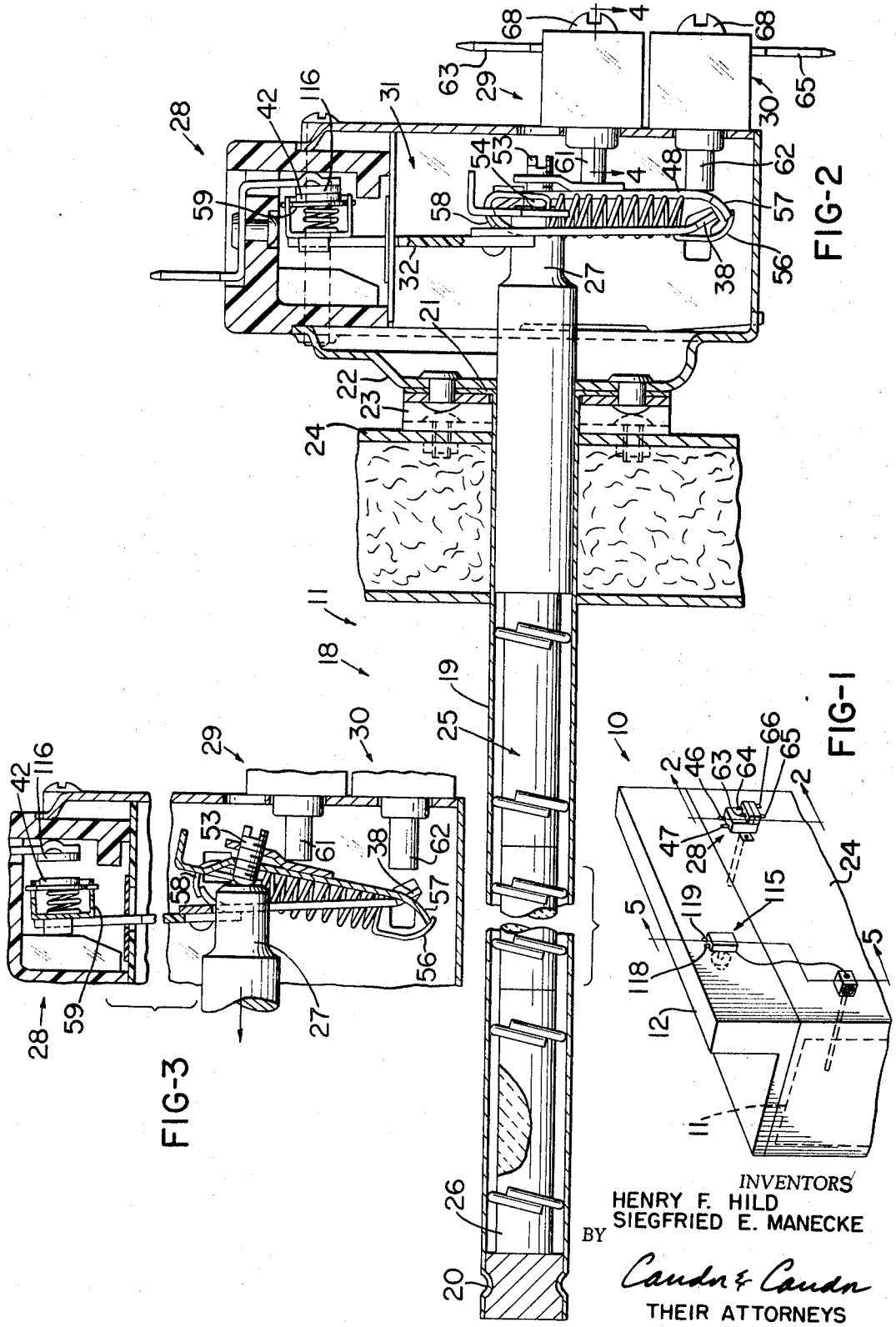

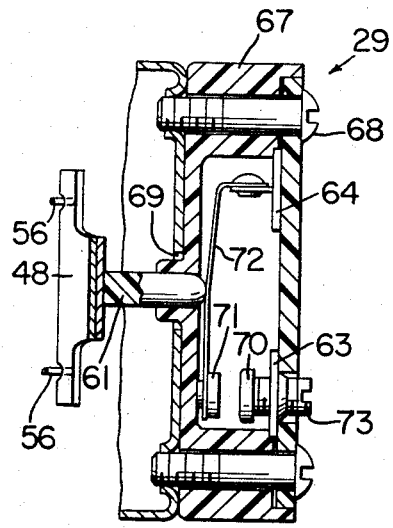
FIG-4
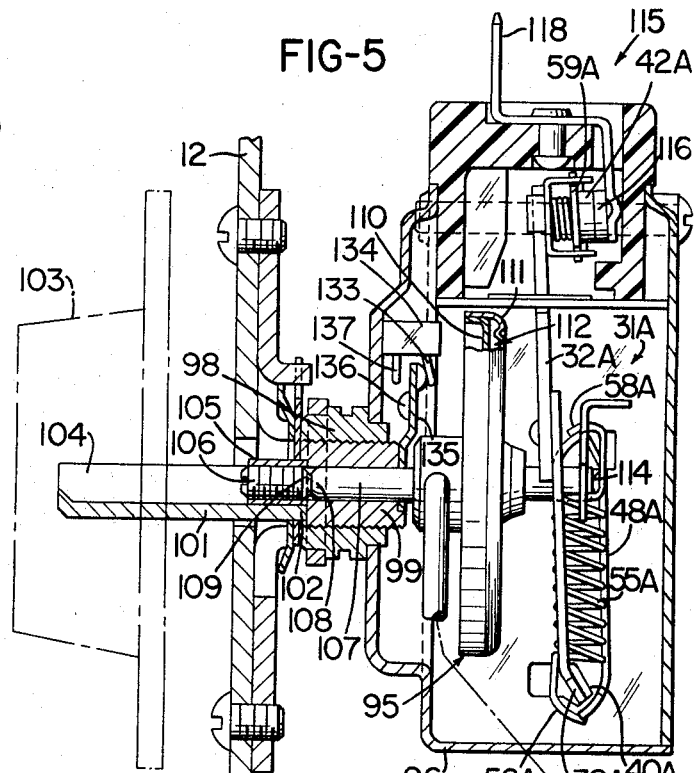
FIG-5
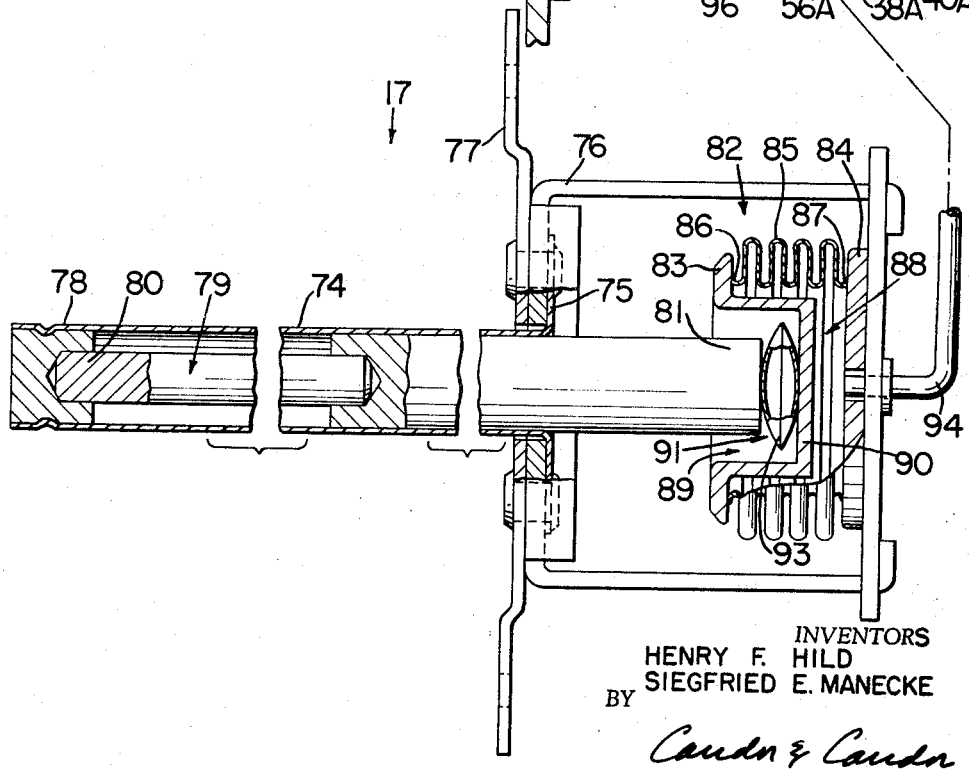
INVENTORS
HENRY F. HILD
SIEGFRIED E. MANECKE
BY
Cauda & Cauda
THEIR ATTORNEYS

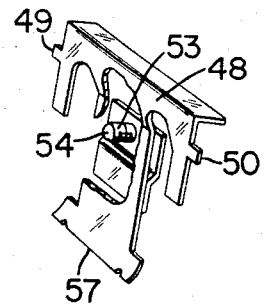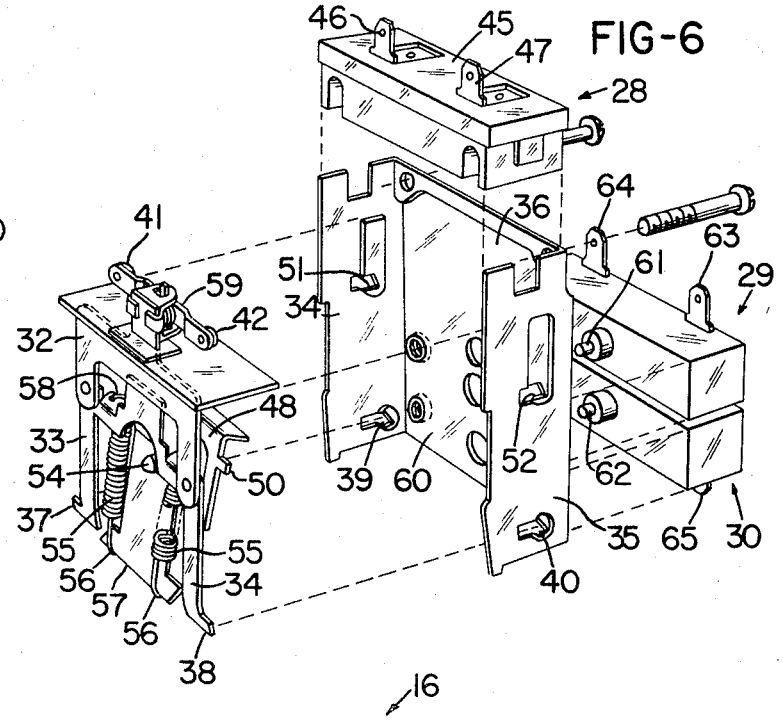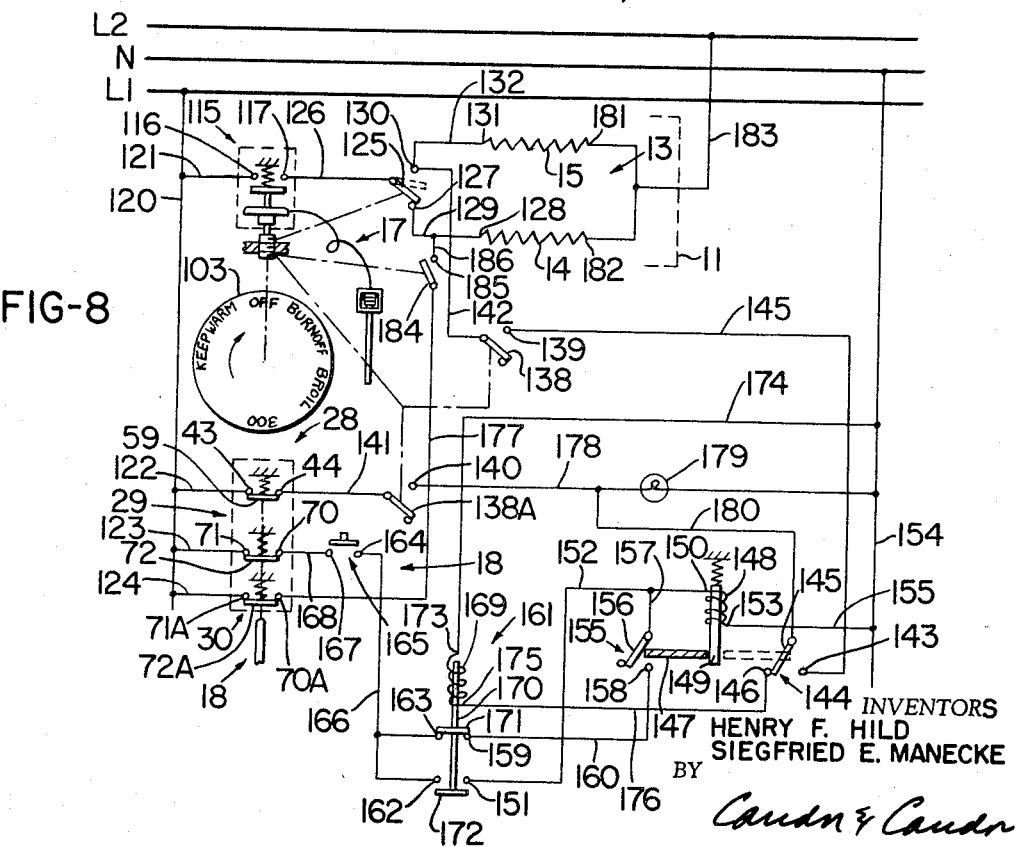

This invention relates to an improved control system for a cooking apparatus or the like as well as to an improved method for operating such a cooking apparatus or the like.

It is well known that various appliance manufacturers are producing cooking apparatus for the home or the like wherein the cooking oven is adapted to be controlled for various types of automatic cooking operations thereof, for automatic noncooking and warmth retaining operations thereof and for relatively high temperature oven burn-off cleaning operations thereof.

It has been found, according to the teachings of this invention, that because of the wide range of temperatures being required for such an oven during the above different operations thereof, prior known temperature sensing means have prevented accurate control of the same and/or such prior known temperature sensing means are relatively complicated and expensive for controlling such temperature ranges.

However, according to the teachings of this invention, an improved oven control system is provided wherein certain operating conditions of the oven or the like are controlled by the temperature sensed by a first temperature sensing unit and other operations of the cooking apparatus are controlled by the temperature sensed by a second temperature sensing unit.

In particular, this invention provides a system wherein a first rod and tube temperature sensing unit is utilized for controlling the heating operation of the oven or the like during normal cooking operations thereof while a second rod and tube temperature sensing unit is utilized to control the cooking apparatus during the high temperature burn-off cleaning operation thereof and/or during the noncooking and warmth retaining operation thereof, the rod and tube units being relatively simple to manufacture and being uniquely interconnected together to provide the above operations in a manner hereinafter described.

Accordingly, it is an object of this invention to provide an improved control system for a cooking apparatus or the like, the system of this invention having one or more of the novel features set forth above or hereinafter shown or described.

Another object of this invention is to provide an improved method for controlling the operation of a cooking apparatus or the like, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a fragmentary perspective view of the rear portion of a conventional cooking apparatus utilizing the various features of this invention.

FIGURE 2 is an enlarged, cross sectional view taken on line 2—2 of FIGURE 1 and illustrates one of the rod and tube temperature sensing units of this invention.

FIGURE 3 is a fragmentary cross sectional view similar to FIGURE 2 and illustrates the unit of FIGURE 2 in another operating position thereof.

FIGURE 4 is a fragmentary cross sectional view taken on line 4—4 of FIGURE 2.

FIGURE 5 is an enlarged, fragmentary, cross sectional view taken on line 5—5 of FIGURE 1 and illustrates the other rod and tube temperature sensing unit of this invention.

FIGURE 6 is an exploded perspective view of certain of the parts of the unit of FIGURE 2.

FIGURE 7 is a fragmentary, partially broken away view of one of the parts of the unit of FIGURE 6.

FIGURE 8 is a schematic view illustrating the method and system of this invention.

While the various features of this invention are hereinafter described and illustrated as being particularly adaptable for providing the control means for electrical heater means, it is to be understood that the various features of this invention can be utilized singly or in any combination thereof to provide control means for other types of heater means, such as gas burning heating means or the like, as desired.

Therefore, this invention is not to be limited to only the embodiment illustrated in the drawings, because the drawings are merely utilized to illustrate one of the wide variety of uses of this invention.

Referring now to FIGURE 1, the improved system and method of this invention is adapted to control various operations of a conventional cooking apparatus, such as the domestic free-standing range 10 illustrated schematically in FIGURE 1 which has an oven 11 therein and a control panel means 12.

As illustrated in FIGURE 8, the oven 11 of the cooking apparatus 10 includes a conventional electrical heating means 13 which in the embodiment illustrated in FIGURE 8 comprises an electrically operated bake heating element 14 and an electrically operated broil heating element 15, the heating means 13 being adapted to be supplied electrical current from a conventional three-wire electrical power source comprising two power lines $L^1$ and $L^2$ and a neutral line N in a manner hereinafter set forth.

The system and method of this invention is generally indicated by the reference numeral 16 in FIGURE 8 and includes a first temperature sensing rod and tube arrangement 17 for controlling the normal cooking operations of the oven 11 and a second temperature sensing tube and rod arrangement 18 for controlling the high temperature burn-off cleaning operation of the oven 11 and/or the low temperature noncooking and warmth retaining operation of the oven 11 in a manner hereinafter described.

As illustrated in FIGURE 2, the rod and tube temperature sensing unit 18 comprises a tube means 19 having opposed end means 20 and 21, the end means 21 being secured to a frame means 22 with the frame means 22 carrying mounting bracket means 23 to mount the unit 15 against the rear wall or frame means 24 of the cooking apparatus 10. In this manner, the other end means 20 of the tube means 19 projects into the oven 11 to sense the temperature thereof in a manner hereinafter set forth.

A rod means 25 is disposed in the tube means 19 and has one end means 26 adapted to move in unison with the end means 20 of the tube means 19 in a manner hereinafter described while the other end means 27 of the rod means 25 projects out through the opened end 21 of the tube means 19 for a purpose hereinafter described.

The frame means 22 of the unit 18 is adapted to carry a plurality of electrical switches to be operated in accordance with the movement of the end means 27 of the rod means 25 in the manner hereinafter described, the embodiment of the unit 18 in FIGURE 2 including three electrical switches generally indicated by the reference numerals 28, 29 and 30.

The electrical switch means 28 is adapted to control the high temperature burn-off cleaning operation of the oven 11, the electrical switch 29 is adapted to control a safety latch means for the oven door during the high temperature burn-off cleaning operation and the electrical switch 30 is adapted to control the low temperature noncooking and warmth retaining operation of the oven 11 in a manner hereinafter described. However, it is to be understood that should the switch means 29 be eliminated, the switch means 30 will still operate and conversely should the switch means 30 be eliminated the switch means 29 will still operate in a manner hereinafter described. Also, should the switches 29 and 30 or either one of the switches 29 and 30 be eliminated, the switch 28 will still be operative.

The tube means 19 of the unit 18 has a higher cofficient of thermal expansion and contraction than the coefficient of thermal expansion and contraction of the rod means 25 whereby the end means 20 of the tube means 19 will move to the left in FIGURE 2 upon a rise in temperature in the oven 11 and will move to the right in FIGURE 2 upon a decrease in temperature in the oven 11. Since the end means 26 of the rod means 25 follows the movement of the end means 20 of the tube means 19 in a manner hereinafter described and since the rod means 25 has a lower coefficient of thermal expansion and contraction than the tube means 19, the end means 27 of the rod means 25 will move to the left in FIGURE 2 upon the unit 18 sensing an increase in temperature in the oven 11 and will move to the right in FIGURE 2 upon the unit 18 sensing a decrease in temperature in the oven 11 whereby this movement of the end means 27 of the rod means 25 will control the operation of the switch means 28–30 in a manner now to be described.

A lever means 31 is carried by the frame means 22 and operatively interconnects the end means 27 of the rod means 25 with the switch means 28–30.

In particular, the lever means 31 includes a first lever member 32 having a pair of legs 33 and 34 respectively pivotally mounted to opposed walls 34 and 35 of a casing means 36 by outwardly directed tangs 37 and 38 thereof being received in pivot slots 39 and 40. The lever member 32 carries a pair of electrical contacts 41 and 42 which move in unison with the lever member 32 and are respectively cooperable with a pair of fixed contacts 43 and 44, FIGURE 8, carried by housing means 45 of the electrical switch 28 and respectively interconnected to terminals 46 and 47 thereof.

A second lever member 48 is provided and is pivotally mounted to the casing means 36 by having outwardly directed tangs 49 and 50 thereof respectively received in pivot slots 51 and 52 in the side walls 34 and 35 of the casing 36. The lever member 48 carries a threaded adjusting member 53 adapted to be moved inwardly and outwardly relative to the other member 48 and has an end 54 which abuts against the end means 27 of the rod means 25 of the unit 18.

A pair of tension spring means 55 each has one end 56 thereof interconnected to the free end 57 of the lever member 48 and the other end 58 interconnected to the lever member 32 whereby the tension spring means 55 cause the lever member 32 to move with a snap movement during its opening and closing operation of the switch means 28.

The adjusting member 53 can be so adjusted relative to the lever member 48 that when the unit 18 senses a temperature above a predetermined temperature, such as around 950° F. during the oven burn-off cleaning operation, the end means 27 of the rod means 25 has moved to the left in FIGURE 3 such a distance that the tension spring means 55 has caused the lever member 32 to snap to the left and break the electrical connection between the terminals 46 and 47 of the switch means 28 as the contacts 41 and 42 have been respectively moved away from the fixed contacts 43 and 44, the contacts 41 and 42 being electrically connected together by a bridging member 59.

When the temperature of the oven 11 falls below the predetermined high temperature setting for the clean off operation thereof, the end means 27 of the rod means 25 has moved back to the right in FIGURE 2 a distance to cause movement of the lever member 48 so that the tension spring means 55 will snap the lever member 32 back to the right to again electrically interconnect the terminals 46 and 47 together for a purpose hereinafter described.

The electrical switch means 29 and 30 of the unit 18 are detachably secured in piggy-back relation to a rear wall 60 of the casing means 36 and respectively have operating plungers 61 and 62 engageable with the lever member 48.

The switch means 29 has a pair of terminals 63 and 64 and the switch means 30 has a pair of terminals 65 and 66, FIGURE 1.

Since the details and operation of the switch means 29 and 30 are substantially identical, only the structural details of the switch means 29 are illustrated in FIGURE 4 and will now be described.

As illustrated in FIGURE 4, the switch means 29 includes a casing 67 detachably secured to the rear wall 60 of the casing 36 by threaded fastening members 68, the operating plunger 61 thereof passing through an opening 69 in the casing wall 60 to be engageable by the lever member 48 as illustrated. The terminals 63 and 64 of the switch means 29 are respectively electrically interconnected to a normally fixed but adjustable contact 70 and a movable contact 71 whereby when the contacts 71 and 70 are in contact with each other, electrical current can flow between the terminals 63 and 64 for a purpose hereinafter described.

The movable contact 71 of the switch means 29 is carried on a spring blade 72 which has a natural tendency to hold the contact 71 away from the contact 70 in the manner illustrated in FIGURE 4, the spring blade 72 being engageable by the plunger 61 whereby the force of the leaf spring blade 72 maintains the plunger 61 in contact with the lever 48 so that the plunger 61 will follow the movement of the lever 48. The fixed contact 70 is carried on a threaded adjusting member 73 threadedly received through the terminal 63 so that the position of the contact 70 relative to the terminal 63 can be adjusted for determining the particular temperature sensed by the unit 18 that will cause opening and closing of the contacts 70 and 71.

In particular, when the unit 18 is sensing a temperature below a temperature that the oven door latch means should be positively held in its latched position, the end means 27 of the rod means 25 is in such a position to the right in FIGURE 2 that the lever member 48 holds the plunger 61 in such a position that the contact 71 is held in electrical contact with the contact 70 so that the terminals 63 and 64 thereof are electrically interconnected together.

However, when the tempreature in the oven 11 rises to approximately 600° F., the end means 27 of the rod means 25 of the unit 18 has moved to the left in FIGURE 2 to such a position that the lever member 48 following the movement thereof permits the plunger 61 to move to the left in FIGURE 4 a distance sufficient to permit the spring blade 72 to move the contact 71 out of electrical contact with the contact 70 so that no electrical current can flow between the terminals 63 and 64 of the electrical switch 29.

The operation and structure of the electrical switch 30 is substantially identical to the electrical switch 29 and like parts thereof are indicated by like reference numerals followed by the reference letter A in FIGURE 8 as well as in other figures of the drawings.

Thus, as long as the unit 18 is sensing a temperature below a preselected keep warm and non-cooking temperature, such as 170° F., the plunger 62 of the switch means 30 holds the contact 71A thereof in electrical contact with the contacts 70A to electrically interconnect the terminals 65 and 66 thereof. However, when the unit senses a temperature above 170° F., the lever 48 has moved to cause the contact 71A to move out of contact with the contact 70A to disconnect the electrical connection between the terminals 65 and 66.

The structural details and operation of the rod and tube temperature sensing arrangement 17 will now be described and reference is made to FIGURE 5.

As illustrated in FIGURE 5, the rod and tube arrangement 17 includes a tube means 74 having one end means 75 thereof secured to a frame means 76 adapted to be mounted to the wall means 24 of the cooking apparatus 10 by a bracket means 77, the other end means 78 of the tube means 74 being adapted to project through an opening in the rear wall means 24 of the apparatus 10 to sense the temperature in the oven 11.

A rod means 79 is disposed within the tube means 74 and has one end means 80 adapted to move in unison with the end means 78 of the tube means 74 in a manner hereinafter described and has an opposed end means 81 projecting out of the opened end means 75 of the tube means 74 to cause actuation of a pneumatic fluid containing chamber defining means 82 in a manner hereinafter described.

The chamber defining means 82 is a bellows construction formed from a pair of rigid wall means 83 and 84 interconnected together by a tubular bellows construction 85 having the opposed opened ends 86 and 87 thereof respectively sealed and secured to the rigid wall means 83 and 84 to define a chamber 88 therebetween. The rigid wall means 84 is secured from movement to the frame means 76 and the rigid wall means 83 is movable relative thereto and is substantially cup-shaped to define an opened end 89 and a closed end 90 thereof.

The end means 81 of the rod means 79 is received in the opened end 89 of the cup-shaped movable wall means 83 and engages an ambient temperature compensating means 91 disposed between the end means 81 and the closed end 90 of the movable wall means 83. In the embodiment illustrated in the drawings, the ambient compensating means 91 comprises a pair of cup-shaped disc members 92 formed of bimetallic material and having the open ends 93 thereof abutting each other.

In this manner, should the ambient temperature surrounding the end means 81 of the rod 79 increase to tend to cause the pneumatic fluid in the chamber 88 to expand, the cup-shaped bimetal members 92 tend to flatten to permit the fluid in the chamber 88 to expand and thereby prevent the same from being forced out of the chamber 88 into a conduit means 94 leading to a chamber of another pneumatic fluid containing chamber defining means 95. Conversely, should the ambient temperature surrounding the chamber defining means 82 decrease to tend to cause a contraction in the pneumatic fluid in the chamber 88, the bimetal members 92 tend to further bow to reduce the volumetric capacity of the chamber 88 so that fluid will not be drawn from the other chamber defining means 95 through the conduit 94 into the chamber 88.

The other chamber defining means 95 is disposed in a casing 96 mounted to the control panel 12 of the cooking apparatus 10 by mounting means 97. The casing 96 includes an internally threaded member 98 threadedly receiving an externally threaded adjusting member 99 having a bore 100 passing therethrough. A control shaft 101 has one end 102 fixed to the adjusting member 99 and receives a control knob 103 on the other end 104 thereof. The shaft 101 carries an internally threaded member 105 receiving a threaded calibration screw 106 adapted to be adjusted inwardly and outwardly relative to the threaded member 105 on the shaft 101.

The chamber defining means 95 includes a stem 107 receivable in the bore 100 of the adjusting member 99 and has an end 108 disposed against the end 109 of the adjusting screw 106. The chamber defining means 95 is a conventional expandable and contractible fluid containing element having two cup-shaped elements 110 and 111 secured together at the outer periphery thereof to define a chamber 112 therebetween, the wall means 110 being substantially fixed while the wall means 111 is movable in response to the volume of pneumatic fluid in the chamber 112 in the manner hereinafter set forth.

The movable wall means 111 of the chamber defining means 95 carries a stem 113 having an end 114 adapted to abut a lever number 48A of a lever means 31A disposed in the casing 96 and formed substantially identical to the lever means 31 previously described except that the lever member 48A does not have the adjusting screw means 53, although the same may utilize the screw means 53, if desired.

Since the lever means 31A is substantially identical to the lever means 31 previously described, parts of the lever means 31A substantially identical to the lever means 30 previously described are indicated by like reference numerals followed by the reference letter A.

As illustrated in FIGURE 5, the lever means 31A is so constructed and arranged that the same operatively interconnects an electrical switch means 115 carried by the casing 96 to the chamber defining means 95. The electrical switch 115 is illustrated in FIGURES 5 and 8 includes a pair of fixed contacts 116 and 117 respectively interconnected to a pair of terminals 118 and 119, FIGURE 1, while the lever member 32A carries a pair of movable contacts 41A and 42A on a bridging member 59A cooperable with the contacts 116 and 117 in the same manner as the bridging member 59 previously described.

The control knob 103 comprises a selector means which when rotated relative to the control panel 12 will cause rotation of the adjusting member 99 and, thus, threaded axial movement of the adjusting member 99 relative to the fixed threaded member 98 of the casing means 96. Such axial movement of the adjusting member 99 also axially positions the end 109 of the adjusting member 106 whereby the spring means 55A of the lever means 31A causes the end 108 of the stem 107 of the chamber defining means 95 to follow the movement of the end 109 of the adjusting screw 106 so that the position of the chamber defining means 95 relative to the casing 96 and, thus, relative to the lever 48A can be adjusted by the control knob 103.

Accordingly, when the housewife or the like adjusts the control knob 103 to a desired temperature setting position thereof to cause operation of the heating means 13 in a manner hereinafter set forth, the tube means 74 of the rod and tube arrangement 17 will move to the left or to the right in FIGURE 5 depending upon an increase or decrease in the temperature of the oven 11 and since the rod means 79 has a lower coefficient of thermal expansion and contraction than the coefficient of thermal expansion and contraction of the tube means 74, the tube means 74 will cause the end means 81 of the rod means 79 to move to the left upon an increase in temperature and move to the right upon a decrease in temperature.

When the unit 17 is sensing an increase in temperature in the oven 11, the end means 81 of the rod 79 moves to the left whereby the natural resiliency of the bellows construction 85 causes the wall means 83 to move in unison with the end means 81 to the left to increase the volumetric capacity of the chamber 88 whereby fluid is drawn from the chamber 112 of the chamber defining means 95 to fill the increased volume of the chamber 88 whereby the movable wall 111 of the chamber defining means 95 also moves to the left to correspondingly decrease the volumetric capacity of the chamber 112. With the wall 111 now moving to the left, the end 114 of the stem 113 also moves to the left permitting the lever member 48A to follow such leftward movement in such a manner that the spring means 55A of the lever means 31A will cause the lever member 32A to snap to its open position when the unit 17 senses an increase in temperature in the oven 11 above the temperature selected by the control knob 103.

In this manner, the contact means 41A and 42A are moved away from the contact means 116 and 117 to prevent current flow between the terminals 118 and 119.

Conversely, when the unit 17 senses a decrease in the temperature of the oven 11, the end means 81 of the rod means 79 moves to the right in FIGURE 5 and collapses the bellows member 85 to reduce the volumetric capacity of the chamber 88 whereby the fluid therein is forced out of the chamber 88 and through the conduit means 94 into the chamber 112 of the chamber defining means 95 to move the stem 113 thereof to the right in FIGURE 5. When the temperature being sensed by the unit 17 falls below the temperature selected by the knob 103, such rightward movement of the stem 113 of the chamber defining means 95 causes the lever means 31A to move the lever member 32A with a snap movement to close the contacts 41A and 42A against the contacts 116 and 117 of the switch 115 to again electrically interconnect the terminals 118 and 119 thereof.

Therefore, it can be seen that the rod and tube arrangement 17 is adapted to accurately control the operation of the switch means 115 even though the switch means 115 and the chamber defining means 95 are disposed in a remote location relative to the chamber defining means 82 sensing the movement of the end means 81 of the rod means 79.

The temperature sensing units 17 and 18 are adapted to be utilized in the method and system 16 of this invention in a manner now to be described to control the operations of the cooking apparatus 10.

In particular, it can be seen in FIGURE 8 that the power lead $L^1$ is interconnected to a lead 120 which, in turn, is electrically interconnected to the contacts 116, 43, 71 and 71A by branch leads 121, 122, 123 and 124 through the terminals 118, 47, 63 and 65.

The contact 117 of the switch means 115 is interconnected to a switch blade 125 by a lead 126 interconnected to the terminal 119, the switch blade 125 having one position against a contact 127 leading to one side 128 of the bake element 14 by a lead 129, another position against a contact 130 electrically interconnected to one side 131 of the broil element 15 by a lead 132 and another position intermediate the contacts 127 and 130 as illustrated in dotted lines in FIGURE 8.

The switch blade 132 is controlled by a plunger 133 of a limit switch 134, FIGURE 5, carried by the casing 96 and actuated by cam means 135 carried by the adjusting member 99.

Thus, when the control knob 103 is disposed in its "keep warm" position, the cam means 135 holds the switch blade 132 intermediate the contacts 127 and 130. When the control knob 103 is disposed in any of its temperature setting positions for controlling a cooking operation utilizing the bake element 14, the cam means 135 causes the switch blade 125 to be disposed against the contact 127 in the manner illustrated in full lines in FIGURE 8. However, when the control knob 103 is disposed in its "broil" position, the switch blade 125 is disposed against the contact 130.

When the control knob 103 is set in its "burn-off" position, the cam means 135 again positions the switch blade 125 in the dotted position of FIGURE 8 between the contacts 125 and 130.

In the "burn-off" position of the selector knob 103, the other side 136 of the cam means 135 operates another plunger 137 of the switch means 134 to position a first switch blade 138 against contact 139 and a second switch blade 138A against a contact 140, the switch blade 138A being interconnected to a lead 141 leading to the contact 44 of the switch means 28 through the terminal 46 thereof.

The switch blade 138 is interconnected to a contact 130 by a lead 142. The contact 139 is interconnected to a contact 143 of a safety switch 144 by a lead 145, the safety switch 144 having a switch blade 145 normally urged against a contact 146 but movable against the contact 143 when the door latch lever 147 is moved from its unlatched position illustrated in full lines in FIGURE 8 over to its door latching position illustrated in dotted lines in FIGURE 8. However, the door latch member 147 cannot be moved to its door latching position until a solenoid coil 148 is energized to raise a pin 149, one side 150 of the coil 148 being interconnected to a relay contact 151 by a lead 152 and the other side 153 being connected to a lead 154 by a lead 155. The lead 154 is electrically interconnected to the neutral lead N of the power source.

Another switch 155 is provided and comprises a switch blade 156 interconnected to the lead 152 by a lead 157 and normally being held away from a contact 158 by the latch member 147 when in its unlatched position but moving against the contact 158 when the latch member 147 is moved to its latched position, the contact 158 being interconnected to a contact 159 by a lead 160. The contacts 151 and 159 form part of a relay 161 and respectively cooperate with contacts 162 and 163 leading to a contact 164 of a manually operated normally open push button switch 165 by a lead 166.

The push button 165 is adapted to bridge the contact 164 with the contact 167 leading to the contact 70 of the switch means 29 by a lead 168 to the terminal 63.

The relay 161 has a solenoid coil 169 for moving a switch member 170 upwardly when the coil 169 is energized to move a bridging member 171 out of bridging contact with the contacts 159 and 163 and to place a bridging member 172 into bridging relation with the contacts 151 and 162. The solenoid coil 169 has one side 173 thereof interconnected to the neutral lead 154 by a lead 174 and the other side 175 thereof interconnected to the contact 146 of the switch 144 by a lead 176.

The contact 70A of the "keep warm" switch means 30 is interconnected to a lead 177 through the terminal 63A thereof.

The contact 140 is interconnected to the lead 154 by a lead 178 having a "burn-off" indicating light 179 therein, the lead 178 being interconnected to the switch blade 145 of the switch 144 by a lead 180.

The other sides 181 and 182 of the elements 15 and 14 are interconnected to the power source lead $L^2$ by lead means 183.

The lead 177 is connected to a switch blade 184 which is always held open by the cam means 135 of the selector 103 except in its "keep warm" position wherein the cam means 135 moves the switch blade 184 against a contact 185 connected to the lead 129 by a lead 186.

The operation of the control system and method 16 of this invention will now be described.

With the selector knob 103 disposed in its "off" position, the chamber defining member 95 has been moved to the right in FIGURE 5 such a distance that the lever member 32A is held in its opened position to prevent interconnection between the contacts 116 and 117 thereof regardless of the temperature in the oven 11 and the cam means 135 is so positioned that the switch blades 184, 138 and 138A are held away from the contacts 185, 139 and 140 whereby no electrical current from the power source can be connected to the heater means 13.

If the housewife desires to utilize the oven 11 only for a "keep warm" and non-cooking warmth retaining operation thereof, the housewife turns the control knob 103 to the "keep warm" position thereof whereby the switch blade 125 is moved by the cam means 135 to an intermediate dotted position between the contacts 127 and 130 so that no current can flow through the swich means 115 to the heater means 13. In the "keep warm" position of the selector knob 103, the switch blade 184 is moved against the contact 185 whereby the bake element 14 is adapted to be placed across the power leads $L^1$ and $L^2$ by only the switch means 30. As long as the temperature of the oven 11 remains below the keep warm setting of the switch 30, the contact means 70A and 71A of the switch 30 are closed so that current flows through the bake element 14 to heat the oven 11. However, when the unit 18 senses a temperature above the set "keep warm" temperature, the end 27 of the rod means 25 has moved to the left in FIGURE 2 a distance sufficient to cause opening of the contacts 70A and 71A to terminate the operation of the bake element 14. Thus, in the "keep warm" setting of the control knob 103, the bake element 14 is cycled on and off by the unit 18 through the switch means 30 whereby the temperature in the oven 11 is maintained at the keep warm temperature of approximately 170°.

When the housewife desires to utilize the oven 11 for a normal cooking operation utilizing the bake element 14, the housewife sets the control knob 103 at the desired tempertaure setting thereof, such as 325° F., whereby the cam means 135 holds the switch blade 125 against the contact 127, opens the switch blade 184 away from the contact 185 and maintains the switch blades 138 and 138A away from the contacts 139 and 140. Since the chamber defining means 95 has now been moved to the left in FIGURE 5 by the adustment of the control knob 103 in a "cooking" position thereof, current is adapted to flow through the contacts 116 and 117 of the switch 115 as long as the temperature in the oven 11 sensed by the unit 17 is below the temperature setting of the control knob 103 whereby the bake element 14 is placed across the power leads $L^1$ and $L^2$ by the closed switch 115. However, when the temperature of the oven 11 exceeds the temperature set by the control knob 103 as sensed by the unit 17, the bridging member 59A of the switch 115 is moved away from bridging relation with the contacts 116 and 117 to terminate the operation of the bake element 14. Thus, it can be seen that in a baking operation of the oven 11, the bake element 14 is cycled on and off by the switch means 115 under the control of the temperature sensing unit 17 to maintain the temperature in the oven 11 at the temperature selected by the control knob 103.

When the housewife or the like desires to utilize the cooking apparatus 10 for a broiling operation thereof, the housewife turns the selector knob 103 to the "broil" position thereof whereby the cam means 135 moves the switch blade 125 against the contact 130 while maintaining the switch blade 184 away from its contact 185 and the switch blades 138 and 138A away from their respective contacts 139 and 140 whereby the broil element 15 is energized and deenergized under the control of the switch 115 in response to the temperature sensed by the unit 17 in a manner similar to the above described cooking operation for the bake setting of the selector knob 103.

When the housewife or the like desires to utilize the control system 16 of this invention to effect a cleaning of the oven 11, the housewife turns the selector knob 103 to its "burn-off" position whereby the cam means 135 maintains the switch blade 184 away from the contact 185, maintains the switch blade 125 away from the contacts 127 and 130 and places the switch blades 138 and 138A against the contacts 139 and 140 whereby the burn-off light 179 is energized. However, the closed switch 28 cannot energize the broil element 15 until the housewife moves the latch member 147 to its dotted line latching position of FIGURE 8. In order to move the latch member 147 past the pin 149 to its latching position, the housewife must push in on the button 165. Since the relay member 170 is now in its up position because the switch blade 138A has caused the coil 169 to be energized, the button 165, when pushed in, bridges the contacts 164 and 167 and current flows across the contacts 162 and 151 by the bridging member 152 to place the solenoid coil 148 across the power leads $L^1$ and N whereby the pin 149 is drawn upwardly so that the housewife can manually move the latching member 147 from its unlatched position to its latched position illustrated in dotted lines in FIGURE 8. With the latch member 147 in its latched position, the button 165 is released whereby the coil 148 is deenergized and the latch member 149 drops into place so that the latch member cannot be moved from its latched position back to its unlatched position until the coil 148 is again energized. With the latch member 147 in its latched position, the switch blade 156 is now against the contact 158 and the switch blade 145 is against the contact 143 whereby the power lead $L^1$ is interconnected to the closed switch 28, switch blade 138A, contact 143 of the switch 144 through the contact 139 and through the switch blade 138 to place the broil element 15 across the leads $L^1$ and $L^2$ for the burn-off operation. Since the switch blade 145 has been moved away from the contact 146, the solenoid 169 is deenergized and the relay member 170 drops down to the full line position illustrated in FIGURE 8 whereby the solenoid 148 of the latching pin 149 can only be energized to raise the pin 149 by pushing in of the button 165. However, as the temperature of the oven 11 exceeds the safety temperature set by the switch 29, the contact 71 is moved away from the contact 70 by the sensing unit 18 so that pushing in on the button 165 while the oven 11 is at a temperature above 600° F. or the like, will not cause the latch pin 149 to be withdrawn to move the latch member 147 to its unlaching position whereby the oven door cannot be opened when the temperature is above 600° F. and the system 16 will not permit the temperature in the oven to exceed 600° F. unless the latch member 147 is in its oven door latching position.

The sensing unit 18 controls the operation of the switch 28 in accordance with the temperature in the oven 11 to maintain the temperature in the oven 11 at the burn-off temperature, such as 950° F., by maintaining the switch 28 closed when the temperature is below the clean-off temperature and opening the switch 28 when the temperature of the oven 11 is above the clean-off temperature.

After the desired length of time of the cleaning operation of the oven 11, the control knob 103 is either turned manually or automatically, such as by the timer clock means or the like, to its "off" position whereby the switch blades 138 and 138A are again moved away from the contacts 139 and 140 to terminate the operation of the broil element 15 under the control of the switch means 28 whereby the temperature of the oven 11 gradually drops. However, the oven door cannot be opened until the temperature of the oven drops below the temperature setting of the safety switch 29 at which time the sensing unit 18 will have caused the contact 71 to be again placed against the contact 70. With the contacts 71 now against the contact 70, the housewife can push in on the button 165 to energize the solenoid coil 148 through the relay arm 171 of the relay 161 and the closed switch 155 to cause the pin 149 to be drawn upwardly whereby with the pin 149 in its up position, the housewife can move the latching member 147 from its latched position back to its unlatched position as illustrated in FIGURE 8 to permit opening of the oven door.

While the system and method 16 of this invention has been previously described with the broil element 15 providing the burn-off operation of the oven 11, it is to be understood that both the bake and broil elements 14 and 15 can be utilized in a burn-off operation or just the bake element 14 if desired without departing from the intent of this invention as such modifications fall within the scope of the appended claims.

Therefore, it can be seen that this invention not only provides an improved control system for a cooking apparatus or the like, but also this invention provides an improved method of operating a cooking apparatus or the like.

While the form of the invention now preferred has been disclosed as required by statute, other forms may be used, all coming within the scope of the claimed subject matter which follows.

What is claimed is:

1. A control system for cooking apparatus having an oven provided with heating means therefor, said system comprising selector means for selecting a normal temperature cooking operation of said oven and a high temperature burn-off cleaning operation of said oven, a first rod and tube temperature sensing unit for thermostatically controlling said heating means during said cooking operation when selected by said selector means, and a second rod and tube temperature sensing unit for thermostatically controlling said heating means during said cleaning operation when selected by said selector means.

2. A control system as set forth in claim 1 wherein said oven has latch means for holding the oven door in its closed position during said cleaning operation thereof, said latch means having actuating means for holding said latch means in its latched position, said second unit controlling the operation of said actuating means whereby said latch means cannot be unlatched when said second unit senses a temperature above a predetermined temperature.

3. A control system as set forth in claim 1 wherein said selector means has means for selecting a non-cooking and warmth retaining temperature operation of said oven, said second unit thermostatically controlling said heating means during said non-cooking and warmth retaining operation when selected by said selector means.

4. A control system as set forth in claim 1 wherein an electrical switch is provided, said switch when closed operating said heating means to heat said oven and when opened terminating the heating operation of said heating means, said first unit opening and closing said switch in accordance with the temperature sensed by said first unit above and below a temperature selected by said selector means.

5. A control system as set forth in claim 4 wherein said heating means comprises electrical heating means and wherein said switch interconnects and disconnects an electrical power source to and from said heating means during said cooking operation.

6. A control system as set forth in claim 1 wherein an electrical switch is provided, said switch when closed operating said heating means to heat said oven and when opened terminating the heating operation of said heating means, said second unit opening and closing said switch in accordance with the temperature sensed by said second unit above and below a predetermined cleaning temperature.

7. A control system as set forth in claim 6 wherein said heating means comprises electrical heating means and wherein said switch interconnects and disconnects an electrical power source to and from said heating means during said cleaning operation.

8. A control system as set forth in claim 2 wherein an electrical switch is provided, said switch controlling said actuating means of said latch means, said second unit opening and closing said switch in accordance with the temperature sensed by said second unit above and below said predetermined temperature.

9. A control system as set forth in claim 2 wherein said selector means has means for selecting a non-cooking and warmth retaining temperature operation of said oven, said second unit thermostatically controlling said heating means during said non-cooking and warmth retaining operation when selected by said selector means.

10. A control system as set forth in claim 3 wherein an electrical switch is provided, said switch when closed operating said heating means to heat said oven and when opened terminating the heating operation of said heating means, said second unit opening and closing said switch in accordance with the temperature sensed by said second unit above and below a predetermined temperature.

11. A method for controlling the operation of a cooking apparatus having an oven provided with heating means therefor, said method comprising the steps of providing selector means, providing a first rod and tube temperature sensing unit, providing a second rod and tube temperature sensing unit, causing said selector means to select a normal temperature cooking operation of said oven, thermostatically controlling said heating means by said first unit during said cooking operation, causing said selector means to select a high temperature burn-off cleaning operation of said oven, and thermostatically controlling said heating means with said second unit during said cleaning operation.

12. A method as set forth in claim 11 and including the steps of providing latch means for holding the oven door in its closed position during said cleaning operation thereof, and controlling the operation of said latch means to hold said latch means in its latched position so that the same cannot be unlatched when said second unit senses a temperature above a predetermined temperature.

13. A method as set forth in claim 11 and including the steps of causing said selector means to select a non-cooking and warmth retaining temperature operation of said oven, and thermostatically controlling said heating means with said second unit during said non-cooking and warmth retaining operation.

14. A method as set forth in claim 11 and including the steps of providing an electrical switch which when closed operates said heating means to heat said oven and when open terminates the heating operation of said heating means, and causing said first unit to open and close said switch in accordance with the temperature sensed by said first unit above and below a cooking temperature selected by said selector means.

15. A method as set forth in claim 14 wherein said heating means comprising an electrical heating means and including the step of causing said switch to interconnect and disconnect an electrical power source to and from said heating means during said cooking operation.

16. A method as set forth in claim 11 and including the steps of providing an electrical switch which when closed operates said heating means to heat said oven and when opened terminates the heating operation of said heating means, and opening and closing said switch with said second unit in accordance with the temperature sensed by said second unit above and below a predetermined oven cleaning temperature.

17. A method as set forth in claim 16 wherein said heating means comprises electrical heating means and including the step of interconnecting and disconnecting an electrical power source to and from said heating means by said switch during said cleaning operation.

18. A method as set forth in claim 12 and including the steps of providing an electrical switch for controlling said latch means, and opening and closing said switch by said second unit in accordance with the temperature sensed by said second unit above and below said predetermined temperature.

19. A method as set forth in claim 12 and including the steps of causing said selector means to select a non-cooking and warmth retaining temperature operation of said oven, and thermostatically controlling said heating means with said second unit during said non-cooking and warmth retaining operation.

20. A method as set forth in claim 13 and including the steps of providing an electrical switch which when closed operates said heating means to heat said oven and when opened terminates the heating operation of said heating means, and opening and closing said switch with said second unit in accordance with the temperature sensed by said second unit above and below a predetermined temperature.

References Cited

UNITED STATES PATENTS

| | | | |
|---|---|---|---|
| 2,782,285 | 2/1957 | Cantlin | 200—137 |
| 2,851,559 | 9/1958 | Rosen | 200—137 |
| 3,027,444 | 3/1962 | Weeks | 126—373 |
| 3,327,094 | 6/1967 | Martin et al. | 219—393 |

BERNARD A. GILHEANY, *Primary Examiner.*

H. B. GILSON, *Assistant Examiner.*